United States Patent
Elving

(10) Patent No.: US 7,299,269 B2
(45) Date of Patent: Nov. 20, 2007

(54) DYNAMICALLY ALLOCATING DATA BUFFERS TO A DATA STRUCTURE BASED ON BUFFER FULLNESS FREQUENCY

(75) Inventor: Christopher H. Elving, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 804 days.

(21) Appl. No.: 09/885,633

(22) Filed: Jun. 19, 2001

(65) Prior Publication Data

US 2002/0194338 A1    Dec. 19, 2002

(51) Int. Cl.
*G06F 15/16*    (2006.01)

(52) U.S. Cl. ........................................ 709/218

(58) Field of Classification Search ................ 709/214, 709/215, 226, 224, 223, 219; 718/704; 707/103
See application file for complete search history.

(56) References Cited

U.S. PATENT DOCUMENTS

| | | | | |
|---|---|---|---|---|
| 5,884,038 | A * | 3/1999 | Kapoor | 709/226 |
| 6,047,356 | A * | 4/2000 | Anderson et al. | 711/129 |
| 6,182,086 | B1 | 1/2001 | Lomet et al. | |
| 6,205,489 | B1 * | 3/2001 | Kapoor | 709/245 |
| 6,240,463 | B1 * | 5/2001 | Benmohamed et al. | 709/238 |
| 6,308,238 | B1 * | 10/2001 | Smith et al. | 710/310 |
| 6,493,837 | B1 | 12/2002 | Pang et al. | |
| 6,661,431 | B1 * | 12/2003 | Stuart et al. | 715/733 |
| 6,665,704 | B1 * | 12/2003 | Singh | 709/203 |
| 6,792,458 | B1 * | 9/2004 | Muret et al. | 709/224 |
| 2002/0042821 | A1 * | 4/2002 | Muret et al. | 709/223 |
| 2002/0056025 | A1 * | 5/2002 | Qiu et al. | 711/133 |
| 2002/0073211 | A1 * | 6/2002 | Lin et al. | 709/224 |
| 2002/0143575 | A1 * | 10/2002 | Hansen et al. | 705/2 |
| 2002/0143932 | A1 * | 10/2002 | Quintero et al. | 709/224 |
| 2002/0194338 | A1 * | 12/2002 | Elving | 709/226 |
| 2004/0133637 | A1 * | 7/2004 | Wesinger et al. | 709/203 |
| 2006/0104268 | A1 * | 5/2006 | Lee et al. | 370/389 |

OTHER PUBLICATIONS

Java Network Programming, 2nd Edition, By Elliotte Rust Harold, Aug. 2000, ISBN 1-56592-870-9.*
Pointers, by Adam Drozdek, Data Structures and Algorithms in C++, 2001, pp. 9-20.*

(Continued)

*Primary Examiner*—Jason Cardone
*Assistant Examiner*—Ajay M Bhatia
(74) *Attorney, Agent, or Firm*—Hickman Palermo Truong & Becker LLP; Christian A. Nicholas

(57) ABSTRACT

A method and apparatus for dynamically allocating data buffers to a data structure is provided. According to one aspect of the invention, the amount of log data that is being stored within data buffers associated with a data structure is monitored. Based on the amount of log data that is being stored within the data buffers, a determination is made as to whether additional data buffers need to be linked into the data structure. If it is determined that additional data buffers do need to be linked to the data structure, one or more free buffers are identified and linked into the data structure.

23 Claims, 10 Drawing Sheets

OTHER PUBLICATIONS

An analysis of the TUX web server, Chuck Lever, Sun-Netscape Alliance, chuckl@netscape.com, Marius Aamodt Eriksen, Linux.com, marius@linux.com, Stephen P. Molloy, University of Michigan, smolloy@engin.umich.ed, CITI Technical Report 00-8, Nov. 16, 2000.*

Discovery of Web frequent patterns and user characteristics from Web access logs: a framework for dynamic Web personalization, Dua, S.; Cho, E.; Iyengar, S.S.; Application-Specific Systems and Software Engineering Technology, 2000. Proceedings. 3rd IEEE Symposium on Mar. 24-25, 2000 pp. 3-8.*

* cited by examiner

DYNAMICALLY ALLOCATING DATA BUFFERS TO A DATA STRUCTURE BASED ON BUFFER FULLNESS FREQUENCY

FIELD OF THE INVENTION

The present invention relates generally to data management, and more specifically, to dynamically tuning the allocation data buffers.

BACKGROUND OF THE INVENTION

The development of the Internet, and in particular the development of the World Wide Web ("WWW"), has created a mechanism whereby a tremendous amount of information has been made publicly available to anyone who has access to a client computer. For example, by interacting with a client computer, a user can connect to thousands, if not millions of different web sites to access and/or retrieve information that is contained within an electronic document or web page.

To provide access to their web site, many businesses contract with an Internet Service Provider ("ISP") to host the company's web site. For many companies, there is a strong desire to obtain statistical information regarding the traffic or "hits" on the company's web site. Thus, as part of hosting a company's web site, an ISP will typically collect a variety of statistical information about each of the hosted web sites. For example, an ISP may collect statistical information such as, the number of access requests ("hits") that are received for a particular site, the volume of hits that are received by a web site during any particular time of day, the frequency that a certain page or image is accessed within the web site, along with other statistical information that may be deemed important for a particular web site.

Traditionally, an ISP will typically assign a single web site domain to each web server. By assigning a single web site domain to each web server, the ISP can easily monitor and log statistical information about the activity that is associated with the web site domain. For example, FIG. 1A illustrates a system 100 in which a web server (SITE_A.COM WEB SERVER 102) has been configured to host a single web site domain ("SITE_A.COM"). In this example, multiple server threads (SITE_A server threads 110, 112, 114, 116), executing in a memory address space 108, service requests for access to the single web site domain SITE_A.COM. In addition, in order to monitor the activity that is associated with the SITE_A.COM domain, as part of servicing the requests from client devices (130, 132, 134, 136), SITE_A server threads 110, 112, 114, 116, repeatedly write SITE_A access information into buffers 120, 122, 124, 126. Thereafter, because each of the buffers 120, 122,124, 126, are guaranteed to only contain access information for the single web site domain (SITE_A.COM), if any of the buffers 120, 122, 124, 126 become full, the contents of the buffer may be stored to a single file (for example, siteA.com log file 106 on physical disk 104), without having to determine which web site domain was associated with the request. Thereafter, statistical information may be later generated for SITE_A.COM domain based on the access information that was stored to physical disk 104.

However, while the practice of assigning a single web site domain to a web server can significantly reduce the complexity of generating and logging statistical access information for a particular web site domain, the practice also introduces a significant scalability problem. For example, using the described configuration, for an ISP to be able to host a hundred different web site domains, the ISP would need to purchase and maintain a hundred different web servers. For most ISPs, maintaining a one-to-one relationship between the number of web servers and the number of web site domains that the ISP can support is both inefficient and financially impracticable.

In an attempt to address the scalability problem, some web servers have been configured to include multiple server threads that execute within separate processes within their own individual memory space. By executing multiple server threads as separate processes within their own individual memory space, certain complexities that are typically associated with generating and logging statistical access information for multiple web site domains may potentially be reduced.

For example, FIG. 1B illustrates a system 150 that includes a web server 152 that consists of multiple server threads (160, 162, 164, 166) each of which execute in a separate memory space 158a-d, respectively. In addition, server threads 160, 162, 164, 164, are respectively associated with buffers 170, 172, 174 and 176, which are each used to buffer access information for a distinct web site domain (SITE_A.COM, SITE_B.COM, SITE_C.COM, SITE_D.COM), and to store the information to disk 154 within a corresponding log file 156a-d. By servicing multiple web sites in a single web server, certain inefficiencies that are associated with the system 100 depicted in FIG. 1A can be reduced. In addition, because each server thread (160, 162, 164, 166) executes in a separate memory address space and services access requests for only a single web site domain, the problem of ensuring that log data for one site is not incorrectly stored in the physical log file of another can generally be reduced.

However, a significant drawback with the configuration of system 150 is that by requiring specific processes to be used to service specific web site domains, a scalability problem is again introduced in the system. For example, if SITE_A and SITE_B receive heavy traffic while SITE_C and SITE_D typically receive little or no traffic, up to fifty percent (50%) of system 150 resources (e.g., server threads, buffers, etc.) may sit idle and thus be wasted. In addition, system 150 requires that each web site domain be associated with its own process, which in the case of multiple web site domains can cause the system resources to quickly become depleted. Still further, the overhead that is associated with swapping between the different memory address spaces for each of the server threads can itself be a significant drain on the system resources.

Based on the foregoing, there is a clear need for an improved mechanism that allows multiple web site domains to be efficiently serviced by a single web server.

SUMMARY OF THE INVENTION

A method and apparatus are provided for dynamically allocating data buffers to a buffer array. According to one aspect of the invention, the amount of log data that is being stored within data buffers associated with a buffer array is monitored. Based on the amount of log data that is being stored within the data buffers, a determination is made as to whether additional data buffers need to be linked into the buffer array. If it is determined that additional data buffers do need to be linked to the buffer array, one or more free buffers are identified and linked into the buffer array.

According to another aspect, dynamic allocation of data buffers in a web server is provided. In this aspect, a web server in configured to service requests for multiple web site domains. A buffer file, that is assigned to a particular web site domain within the multiple web site domains, includes a buffer array that maintains links to data buffers that are used to buffer log data. The buffer log data is based on content requests that are directed to the particular web site domain. Allocation of data buffers to the buffer array is dynamically controlled based on the number of content requests that are received by the web server for content that is associated with the particular web site domain.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

An efficient buffering mechanism is provided for buffering information that is associated with requests for electronic content. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A tuning mechanism that dynamically allocates data buffers is provided. In one embodiment, a web server is configured to service requests for content that is located in different web site domains. To service the requests, the web server employs a connection queue that receives requests, from multiple clients over a network, for access to content located in multiple web site domains. Upon receipt, the requests are queued within a connection queue for service by one of a plurality of server threads. The server threads are configured as virtual servers that allow them to service requests for different web site domains by removing the requests from the connection queue and loading the configuration data that is associated with the specific web site domain. As part of servicing a request, each server thread generates log data based on the content that is being requested by the particular client. The server thread then interfaces with a log manager to identify a buffer file that is configured for buffering log data that is associated with the specific web site domain. To buffer the log data, an efficient buffering scheme is used to select a buffer within the buffer file and to write the log data into the selected buffer. Thereafter, the log data is written into a log file in secondary memory that is associated with the specific web site domain.

System Overview

Figure 1A:
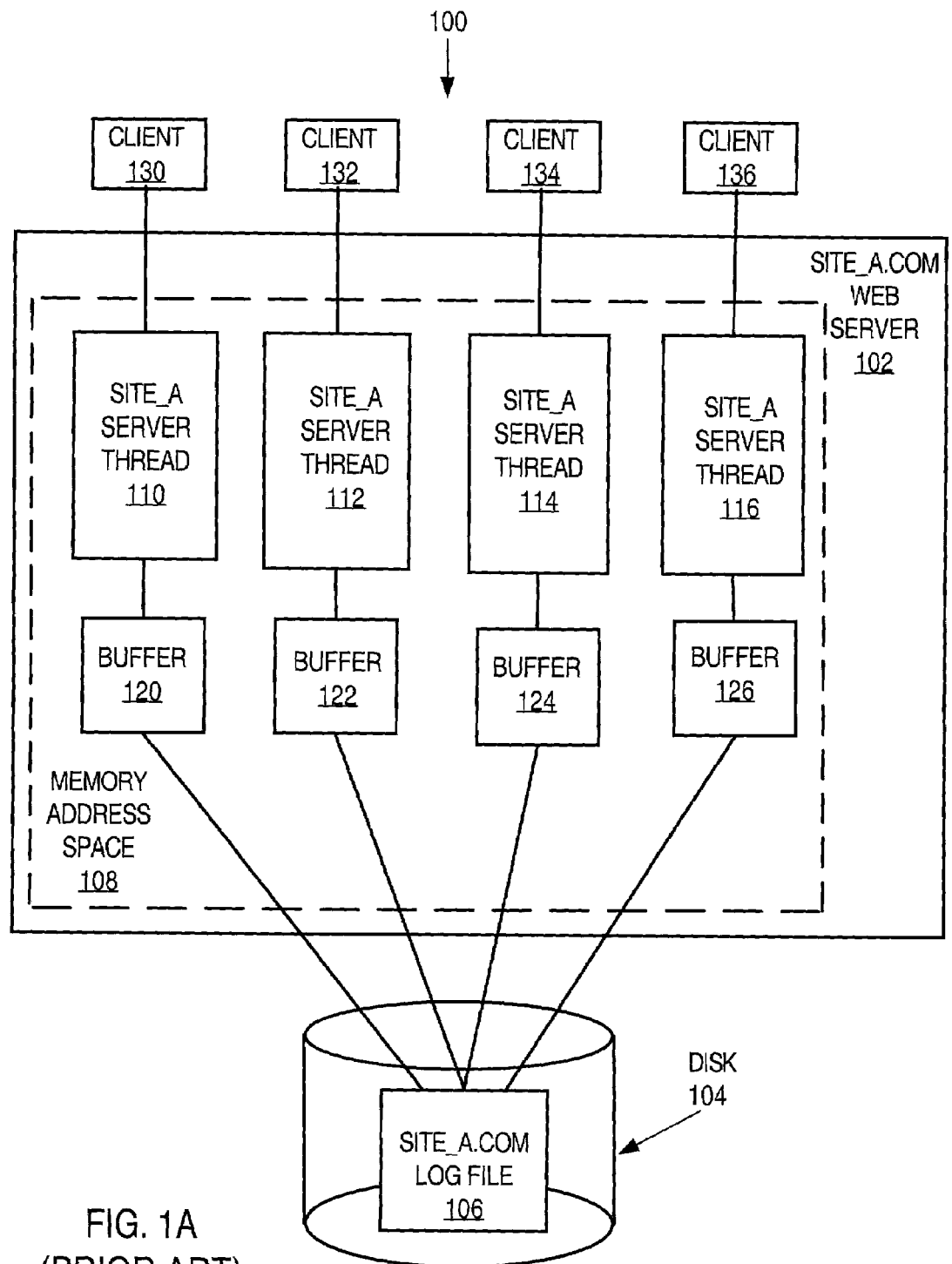
FIG. 1A depicts a conventional system in which a web server is configured to host a single web site domain.
Figure 1B:
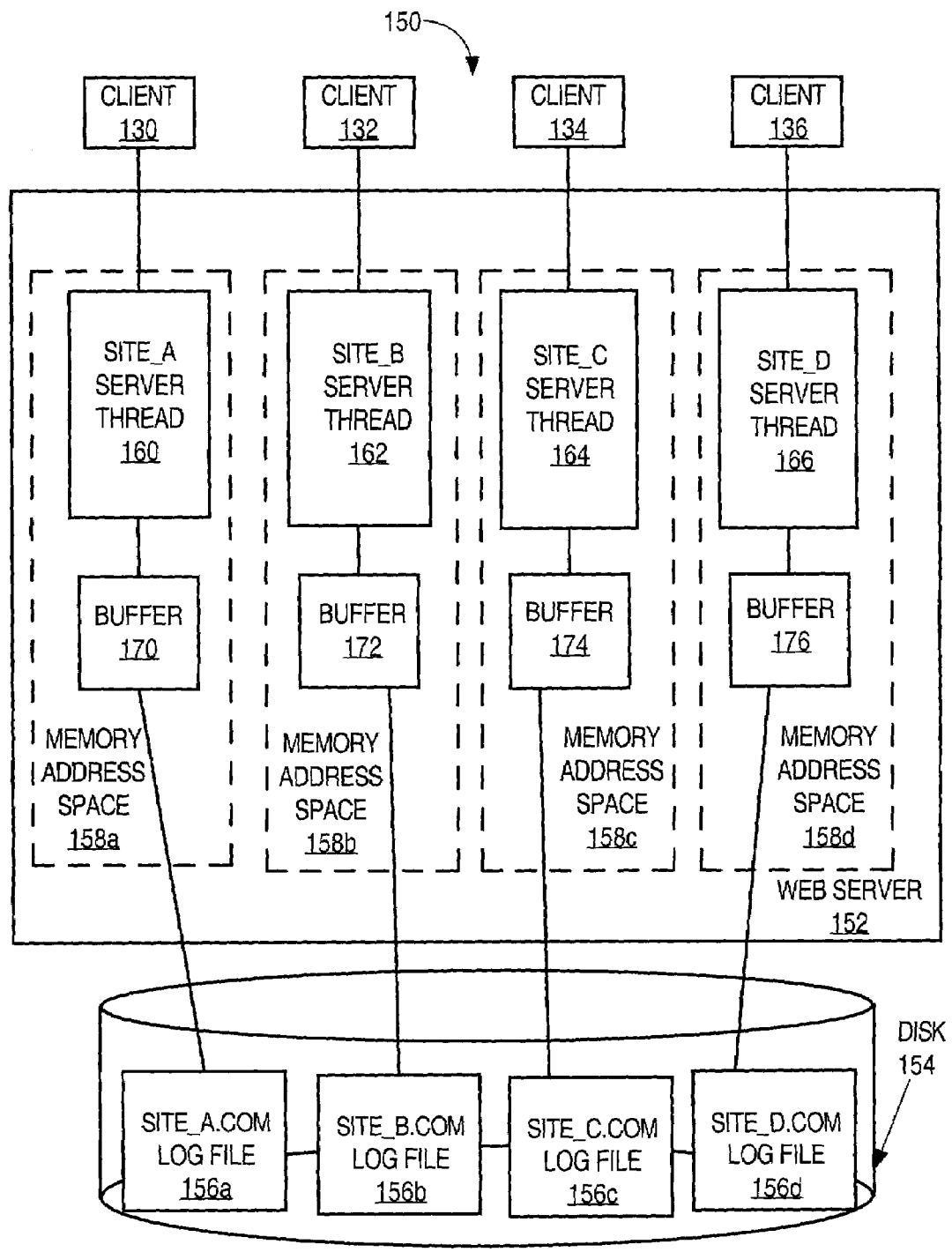
FIG. 1B depicts another conventional system in which a web server is configured to service multiple web site domains by executing separate threads, each within its own memory space.
Figure 2A:
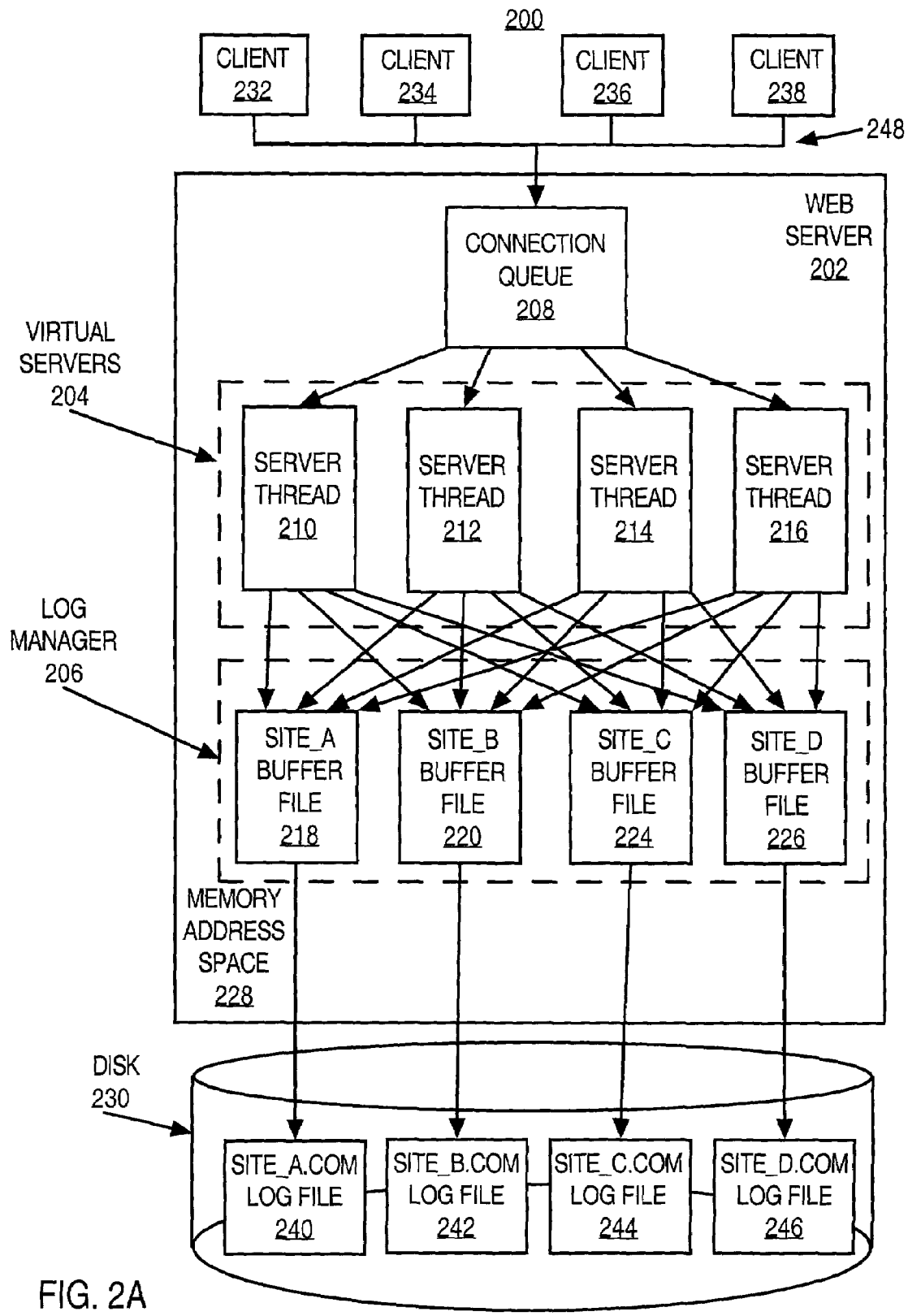
FIG. 2A illustrates an example of a data buffering system in which certain embodiments of the invention may be utilized.

FIG. 2A illustrates an example of a data buffering system 200 in which certain embodiments of the invention may be used. In this example, system 200 includes a plurality of client devices (232, 234, 236, 238), a network 248, a web server 202 and a secondary memory, illustrated herein as disk 230.

Network 248 may represent a private and/or public network, such as the Internet, and comprised of a one or more LANs and/or WANs that are configured for communicating between multiple computing devices. In addition, network 248 may be formed using a variety of different communication mediums, including but not limited to electrical wire or cable, optical, or wireless connection mediums. In one embodiment, network 248 is configured as a packet-switched network that can support such protocols as the HyperText Transport Protocol (HTTP) or the Wireless Access Protocol (WAP).

Client devices 232-238 represent computing devices that are capable of requesting information or content that is available on one or more web sites. For example, client devices 232-238 may represent a personal computer (PC), a workstation, a cellular phone, a PDA, or other device that is capable of communicating with web server 202 over network 248. In certain embodiments, client devices 232-238 are configured to execute a browser type application, such as Netscape Navigator®, or other similar type of WAP or HTML browser application.

Web Server 202 is a computer, or a group of hardware and/or software components or processes that cooperate or execute in one or more computer systems. In one embodiment, web server 202 is configured to service requests for multiple web site domains. For example, web server 202 may be configured to service requests for content that is associated with the web site domains SITE_A.COM, SITE_B.COM, SITE_C.COM, and SITE_D.COM.

As depicted, web server 202 includes a connection queue 208, a plurality of server threads (210,212,214,216) that execute as virtual servers 204, and a plurality of buffer files (218,220,224,226) that form part of a log manager mechanism 206. In one embodiment, connection queue 208, server threads (210,212,214,216), and buffer files (218,220,224,226) execute within a single memory address space 228.

In this example, connection queue 208 is configured to receive client requests for access to content that is located on web site domains that are serviced by web server 202. Upon receiving a request, connection queue 208 queues the request for service by one of the virtual servers 204. Thereafter, an available server thread ("servicing thread") "picks-up" the queued request and determines the location of the content that is being requested by the client device. Based on the location of the content that has been requested by the client device, the servicing thread loads configuration data for a particular web site domain and generates a set of log data that provides information about the requested content. The servicing thread then identifies, from among the plurality of buffer files (218,220,224,226), a buffer file that has been assigned to buffer log data for the particular web site domain. A buffer within the identified buffer file is then selected for writing the set of log data. As is explain in greater detail below, log manager 206 employs an efficient data buffering scheme for managing the number of available buffers within a buffer file and for selecting the particular buffer that is to be used for storing the set of log file.

Subsequent to writing the log data into a particular buffer within a buffer file, the log data is stored within a log file that is maintained on disk 230. Disk 230 represents a secondary storage and/or memory that is distinct from the memory that is used for buffering the log data. In one embodiment, disk 230 represents a nonvolatile storage device that is accessible by web server 202 for storing log data associated with different web site domains. For example, disk 230 may represent a variety of different secondary storage devices and/or units including, but is not limited to, internal or external disk drives, writeable CD or DVD storage units, or floppy disk or magnetic tape drive units. In addition, although disk 230 is depicted as being separate from web server 202, disk 230 may also be configured as part of web server 202.

In one embodiment, disk 230 maintains a plurality of log files (240,242,244,246) that are used to store log data that is associated with a particular web site domain. For example, SITE_A.COM log file 240 is used to store log data that is associated with requests for content that is located on the web site domain SITE_A.COM.

Processing Content Requests

Figure 2B:
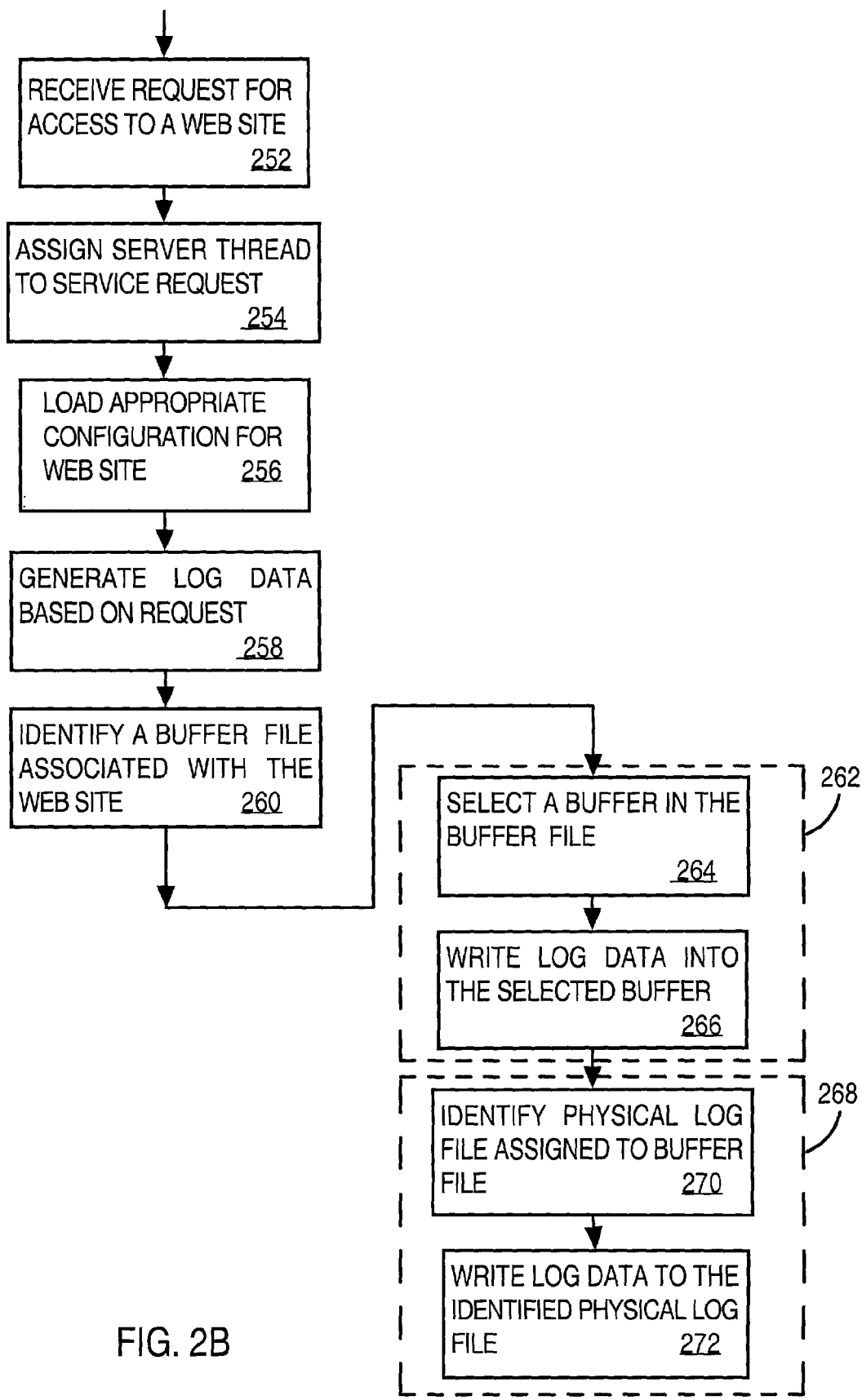
FIG. 2B is a flow diagram that illustrates an example of a method for processing requests for content that is associated with different web site domains.

FIG. 2B is a flow diagram that illustrates an example of a method for processing requests for content that is associated with different web site domains. For explanation purposes, FIG. 2B is described in reference to the components of FIG. 2A.

At block 252, a request is received for access to content that is associated with a particular web site domain. For explanation purposes, it is assumed that the received request is from client 232, that the request is for access to content that is associated with the web site domain "SITE_A.COM," and that the request has been queued within connection queue 208.

At block 254, a server thread is assigned and/or scheduled to service the request. For example, although any available server thread (210,212,214,216) may be assigned to service the request, for this example it is assumed that server thread 214 has been assigned the task of servicing the particular request (i.e., designated as the servicing thread).

At block 256, the servicing thread loads the appropriate configuration data for the web site domain that is associated with the request. For example, upon detecting that the request is associated with the web site domain SITE_A.COM, server thread 214 loads the corresponding configuration data for the web site domain SITE_A.COM. In one embodiment, by loading the SITE_A.COM configuration data, server thread 214 is temporarily configured as a server thread dedicated to servicing requests for content that is available within the SITE_A.COM domain.

At block 258, log data is generated based on the content that was requested by client 232. For example, the generated log data may include, among other things, information that identifies a particular web page that was requested within the SITE_A.COM domain.

At block 260, a buffer file that is associated with the SITE_A.COM domain is identified. In this example, SITE_A buffer file 218 is identified by server thread 214 as containing buffers that are to be used for buffering log data that is associated with the SITE_A.COM domain.

At block 262, which is described in further detail below with respect to FIGS. 3A-3C, an efficient buffering scheme is used to select a particular buffer within the identified buffer file (block 264) and to write the log data into the selected data buffer (block 266).

At block 268, which is described in further detail below with respect to FIG. 3A and FIGS. 4A-4B, a physical log file that is associated with the buffer file is subsequently identified (block 270) and the information contained within the selected data buffer is stored into the identified physical file (block 272). For this example, the SITE_A.com log file 240 on disk 230 is identified as the appropriate physical log file and thus used as the physical log file for storing the log data contain within the data buffer of SITE_A buffer file 218.

Selecting a Buffer for Buffering Log Data

Figure 3A:
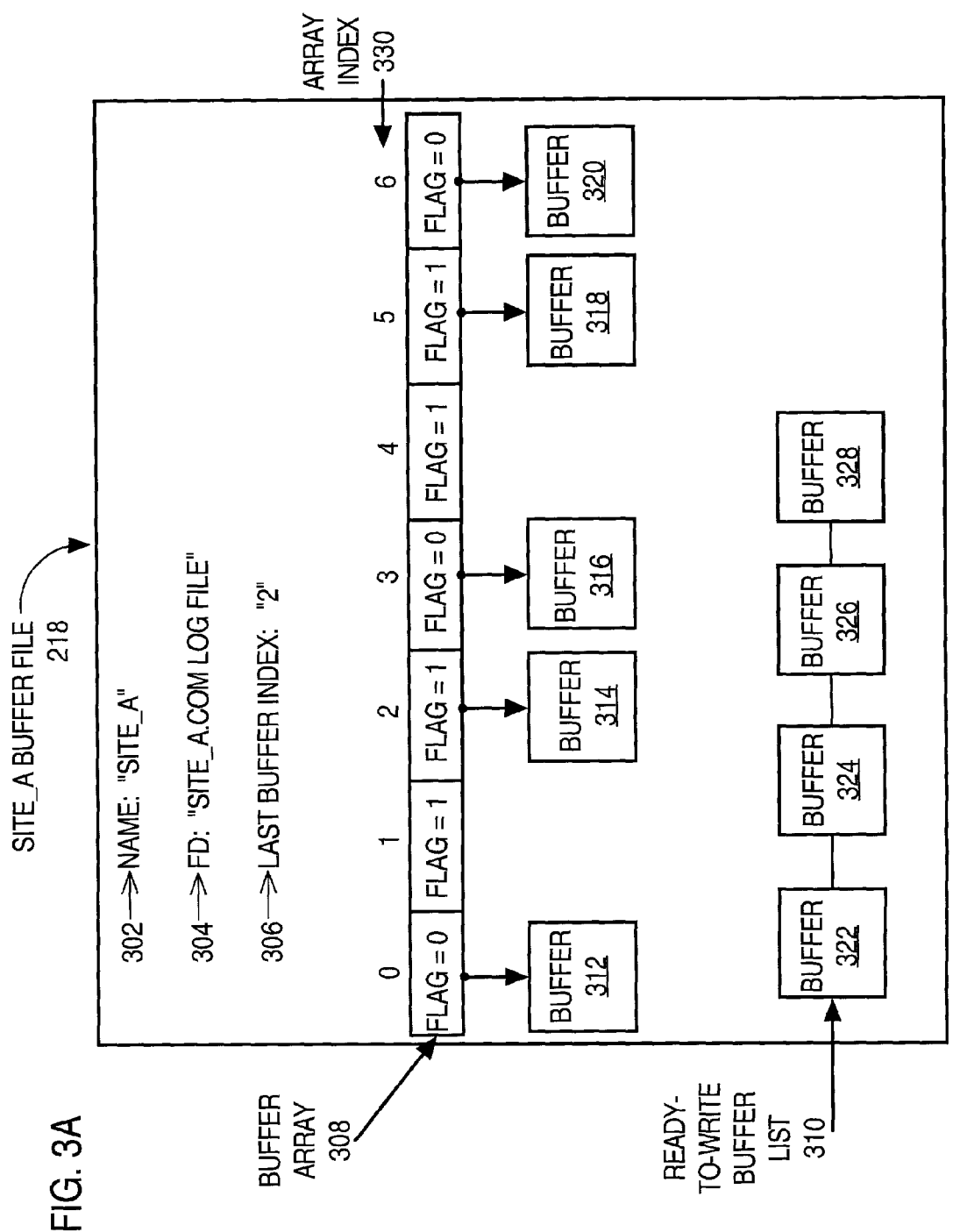
FIG. 3A is a block diagram of a buffer file that depicts certain internal details thereof.

FIG. 3A is a block diagram of SITE_A buffer file 218 showing certain internal details thereof. As depicted in the example of FIG. 3A, SITE_A buffer file 218 includes a name identifier 302, a file descriptor (FD) 304, a last buffer index 306, a buffer array 308 and a ready-to-write buffer list 310.

Name identifier 302 identifies the domain site that has been assigned to the particular buffer file. In this example, name identifier 302 indicates that buffer file 218 has been assigned to buffer log data for the web site domain SITE_A.COM.

File descriptor 304 identifies the physical log file that is to be used to store the buffered log data. In this example, file descriptor 304 identifies the SITE_.com log file 240 on disk 230 as the physical log file that has been designated to the buffered log data that is associated with SITE_A buffer file 218.

Buffer array 308 includes an array of buffers (312,314,316,318,320) that can be used for storing log data. For explanation purposes, a set of array index values 330 is used to help identify the different indices within buffer array 308. In one embodiment, each index is associated with either zero or one buffer, which may or may not be available for buffering log data. For example, the entry in buffer array 308 that is associated with index "5" is currently linked to buffer 318. Alternatively, the entry in buffer array 308 that is associated with index "4" is not currently linked to any buffer.

A variety of techniques and/or algorithms may be used to determine the size of buffer array 308. For example, the number of array entries in buffer array 308 may be dependent on, including possibly a combination thereof, the number of CPUs that exist within the system, the number of server threads that can potentially write into buffers that are associated with buffer array 308, the number of server threads that can be simultaneously active at any point in time, etc. In certain embodiments, the length of buffer array 308 may be dynamically adjusted to increase or decrease the number of buffer array entries.

As further depicted in this example, each entry in buffer array 308 is associated with a flag that indicates whether a particular index in buffer array 308 is likely to contain a buffer that is currently available for writing log data. For example, the flag value of "1" of index "2" of buffer array 308 indicates that buffer 314 is not likely to be currently available for storing log data ("busy"), while the flag value of "0" of index "3" of buffer array 308 indicates that buffer 316 is likely to be currently available for storing log data ("not busy").

In one embodiment, last buffer index 306 identifies the index associated with the last buffer that was selected to store log data. For example, the current value ("2") of last buffer index 306 indicates that the buffer associated with index "2" in buffer array 308 (buffer 314) was last selected to log data. Alternatively, last buffer index 306 may be used to identify the index that was first tried last time a thread attempted to write into a buffer with the buffer array. For example, if the last buffer index 306 currently has a value of "2", when a thread first attempts to write a particular set of data into a buffer in buffer array 308, the value of last buffer index 306 is incremented to equal "3". The thread then determines whether there is a buffer associated with index "3" that is available for writing data. If the thread determines that index "3" is not associated with an available buffer, then the thread next determines whether there is a buffer associated with index "4" that is available for writing data. However, in this case, last buffer index 306 is not incremented to the value "4" but instead retains the value of the index that was first used in attempting to write the particular set of data to a buffer.

Finally, ready-to-write buffer list 310 represents a list of buffers that have been removed from buffer array 308 and which contain log data that is ready to be written out to disk. An example is provided below that describes how the components of SITE_A buffer file 218 may be used to provide an efficient data buffering scheme.

Although this example illustrates the use of a buffer array 308, this is done merely for illustrative purposes as a variety of different data structures may be used for implementing the desired functions. For example, the buffers associated with a buffer file could be placed in a list instead of an array with the list position being used to index the most-recently accessed buffer within the list. Additionally, buffer file 218 is used as merely an example of a type of buffer management structure that may be used to implement the described functions. Thus, embodiments of the invention are not limited to any particular type of buffer management structure.

Selecting a Data Buffer for Writing Log Data

Figure 3B:
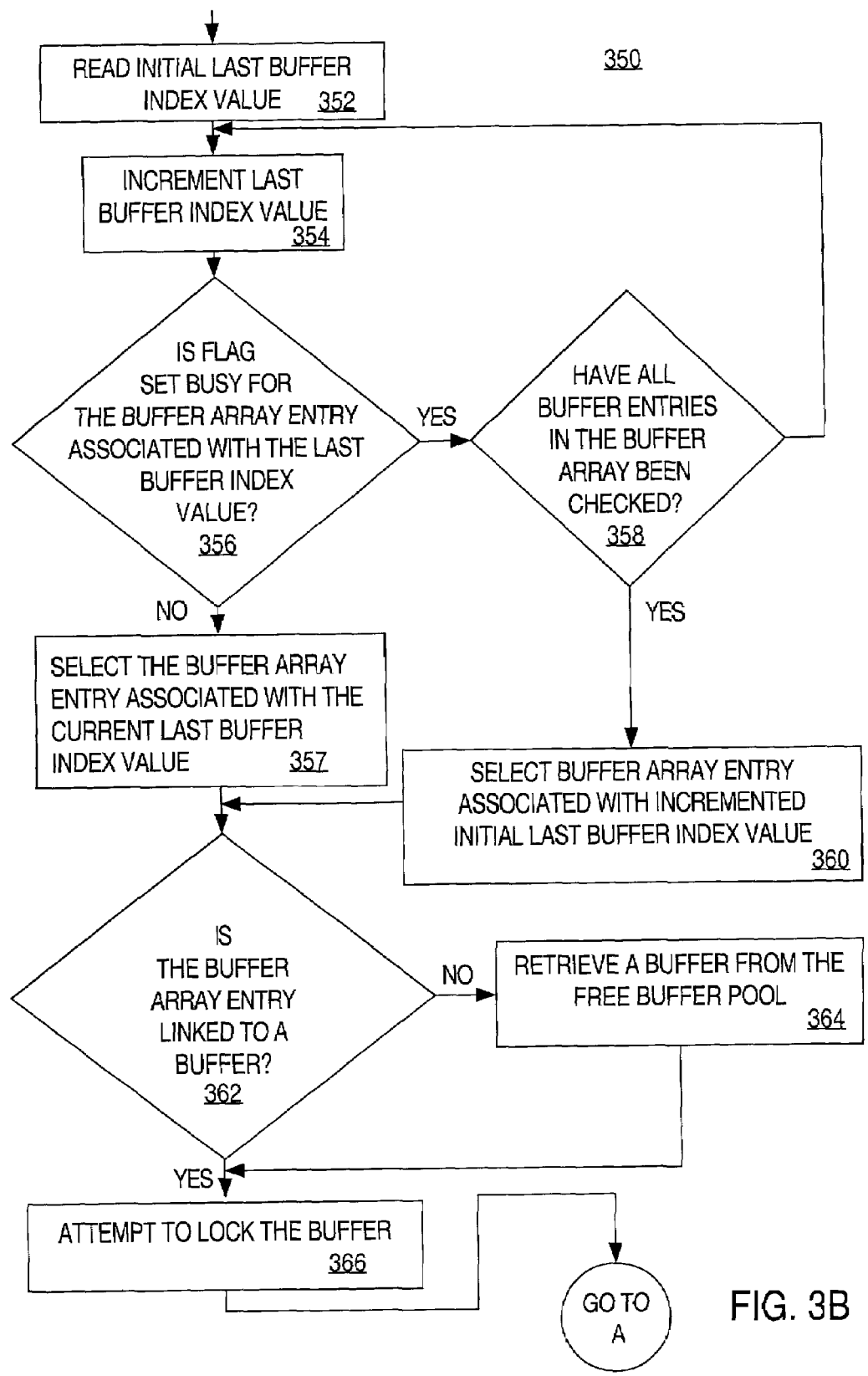
FIG. 3B is a flow diagram that illustrates an example of a method of selecting a data buffer within a buffer file for writing log data.
Figure 3C:
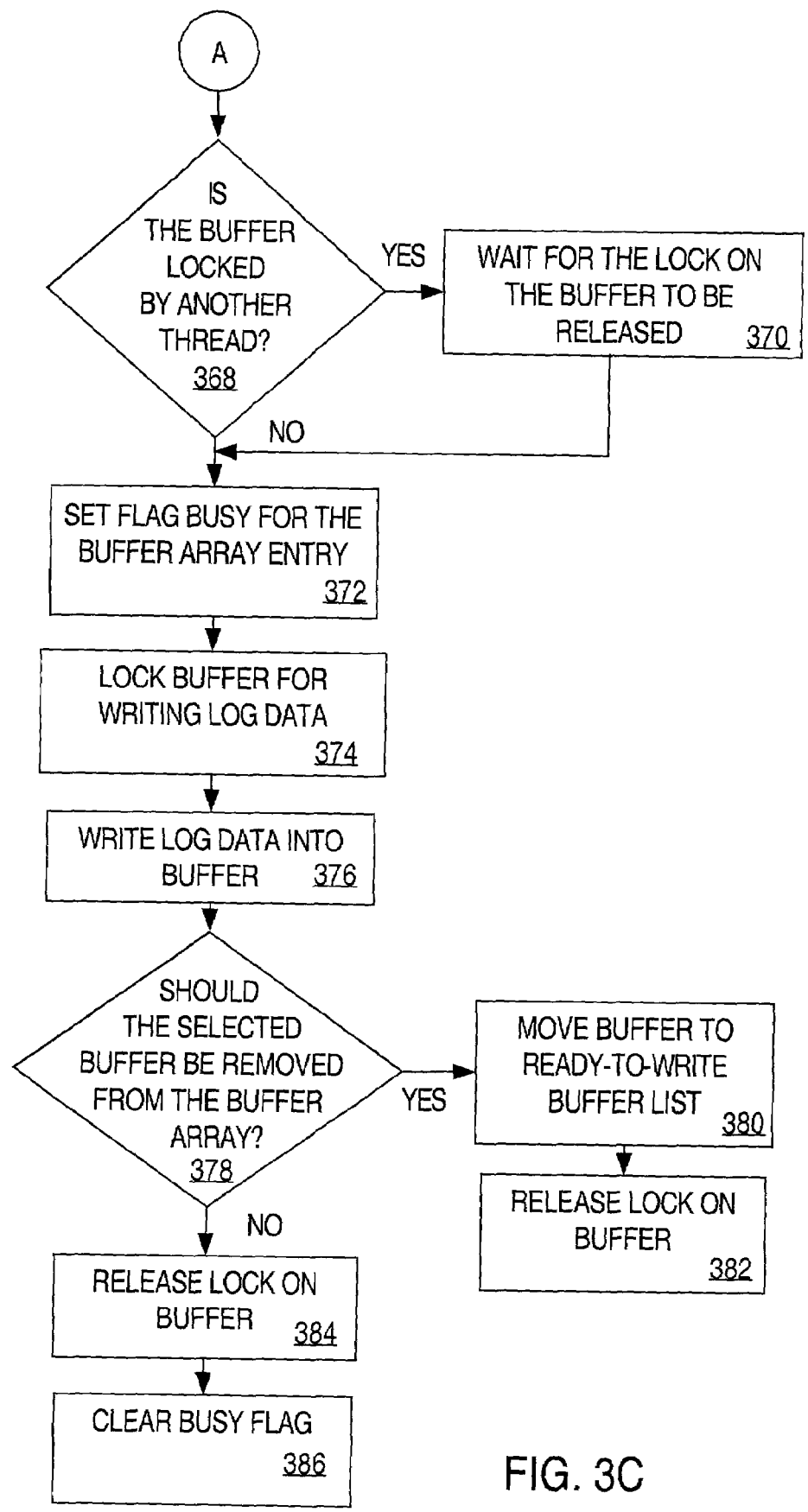
FIG. 3C is a flow diagram that further illustrates an example of a method of selecting a data buffer within a buffer file for writing log data.

FIG. 3B and FIG. 3C is a flow diagram that illustrates an example of a method for selecting a data buffer within a buffer file for writing log data (see block 262 of FIGS. 2B). For explanation purposes, FIG. 3B and FIG. 3C are described in reference to the components of FIG. 3A. Further to this example, it is assumed that SITE_A buffer file 218 was identified as the buffer file for selecting the particular data buffer that is to be used to store the log data.

At block 352, the "initial" value of the last buffer index variable is read from the buffer file. As used herein, the "initial" value represents the value of the last buffer index at the time a server thread initiates the process of selecting a buffer for the particular set of log data. In addition, as used herein, the "incremented initial" value is equal to the initial value after it has been incremented once during the particular selection process. For this example, the "initial" value for the last buffer index 306 is equal to "2" and the "incremented initial" value for the last buffer index 306 is equal to At block 354 the last buffer index value is incremented to point to the next index within the buffer array. For example, the value of last buffer index 306 is incremented so as to equal the value "3". By incrementing the last buffer index value to point to a next index within the buffer file, a mechanism is provided that can increase the chance that the buffer associated with the current index value is likely available for storing log data. In certain embodiments, the MOD function may be used to cause the incrementing of the last buffer index 306 to have a value that wraps around the length of the buffer array 308. For example, if the last buffer index 306 has a value of "6," incrementing the last buffer index 306 will cause the last buffer index 306 to have a value of "0".

At block 356, a test is made to determine whether the flag for the buffer array entry that is associated with the current value of the last buffer index value is set to busy. For example, the flag for the buffer array entry that is associated with the current value of the last buffer index value ("3") is tested to determine if it is set to busy. If it is determined that the flag is not set to busy (for example, the flag equals "0"), control proceeds to block 357.

Alternatively, if at block 356 it is determined that the flag is set to busy, at block 358 a test is made to determine whether all of the buffer entries in the buffer array have been checked for locating an available data buffer. If it is determined that the buffer array includes additional entries that have not yet been checked, control proceeds to block 354 to again increment the last buffer index value. Conversely, if it is determined that the buffer array does not include any additional entries that have not yet been checked, at block 360, the buffer array entry that is associated with the incremented initial value of the last buffer index value is selected as the "selected" buffer array entry. Control then proceeds to block 362. For example, if it is determined that no entry in buffer array 308 is associated with a flag that is not set to busy, the buffer array entry that is associated with the incremented initial value ("3") is selected and control then proceeds to block 362.

At block 357, the buffer array entry that is associated with the current value of the last buffer index variable is selected as the "selected" buffer array entry. For explanation purposes, it shall be assumed that in this example, last buffer index 306 has a current value equal to "3" and that the buffer array entry associated with the array index of "3" has been selected as the selected buffer array entry.

At block 362, a test is made to determine whether the selected buffer array entry is currently linked to a buffer. As is explained in further detail below, buffers that contain log data that is to be written to disk may be removed from the buffer array 308 and inserted into the ready-to-write buffer list 310. In this example, the buffer array entry that is associated with the array index value "3" is currently linked to buffer 316. On the other hand, the buffer array entry that is associated with the array index value "4" is not currently linked to any buffer.

If at block 362 it is determined that the selected buffer array entry is currently linked to a buffer, then the buffer is selected as the "selected" buffer and control proceeds to block 366. Conversely, if it is determined that the selected buffer array entry is not currently linked to a buffer, then at block 364 a buffer is retrieved from a free buffer pool (for example, free buffer pool 408 in FIG. 4A) and linked into the buffer array entry, thus becoming the "selected" buffer. In this example, because the selected buffer array entry (entry "3") is currently linked to buffer 316, buffer 316 is selected as the selected buffer within buffer array 308.

At block 366, an attempt is made to obtain a mutually exclusive lock on the selected buffer.

At block 368, it is determined whether the selected buffer is currently locked by another server thread. For example, if the attempt to obtain the mutually exclusive lock on the selected buffer fails, the selected buffer is likely to be locked by another server thread that is attempting to write its log data into the same selected buffer. If at block 368 it is determined that the buffer is not currently locked by another server thread, control proceeds to block 372 in FIG. 3C.

Alternatively, if at block 368 it is determined that the buffer is currently locked by another server thread, then at block 370 a wait process is initiated to wait for the current lock on the buffer to be released. Thereafter, controls proceeds to block 372.

At block 372, the flag associated with the selected buffer array entry is set to busy. For example, the flag associated with the selected buffer array entry is set equal to "1" in order to inform other server threads that the buffer associated with the selected buffer array entry (buffer 316) is currently not available for storing log data.

At block 374, the selected data buffer is locked for writing log data into the data buffer. For example, a mutually exclusive lock is executed on buffer 316.

At block 376, the log data is written into the selected buffer. For example, the log data generated by server thread 214 is written into buffer 316 in SITE_A buffer file 218.

At block 378, a check is made to determine whether the selected buffer should be removed from the buffer array. For example, in one embodiment, the determination of whether the selected buffer should be removed from the buffer array is made based on the amount of free space that is left within the selected buffer. In another embodiment, the determination of whether the selected buffer should be removed from the buffer array may be based on the amount of time that the selected buffer has remained linked within the buffer array 308.

If at block 378 it is determined that the selected buffer should be removed from the buffer array, the selected data buffer is moved to the ready-to-write buffer list (block 380) and the lock on the selected data buffer is released (block 382). Alternatively, if at block 378 it is determined that the selected buffer should not be removed from the buffer array, the lock on the selected data buffer is released (block 384) and the flag associated with the selected buffer array entry is cleared (block 386).

For example, if it is determined that selected data buffer 316 should be removed from the buffer array 308, selected data buffer 316 is moved to the ready-to-write buffer list 310 and the mutually exclusive lock on selected data buffer 316 is released. Alternatively, if at block 378 it is determined that selected buffer 316 should not be removed from the buffer array 308, the mutually exclusive lock on selected data buffer 316 is released and the flag associated with the selected buffer array entry (buffer array entry for array index "3") is set equal to "0".

Although this example, as with certain other examples within the specification, illustrate a specific sequence of steps for performing a particular process and/or function. However, unless specifically stated in the disclosure, embodiments of the invention are not limited to any particular order of carrying out such steps. For example, the step of setting the flag associated with the selected buffer array entry to busy (block 372), may in certain embodiments, be performed just prior to determining whether the selected buffer array entry is currently linked to a buffer (block 362). Thus, the examples described herein are used for illustrative and/or explanation purposes only and should not be viewed in anyway as limiting the scope of embodiments of the invention.

Global and Local Logging Threads

In certain embodiments, a group of one or more logging threads are used to write log data to a secondary storage. As described in further detail below, the logging threads provide a tuning mechanism for dynamically adjusting the number of buffers that are associated with each buffer file (218,220, 224,226). In certain embodiments, by dynamically tuning the number of buffers that are associated with each buffer file, an efficient buffering system is provided that can dynamically adjust the available resources based on the bandwidth needs of web site domains that are being serviced by the web server.

Figure 4A:
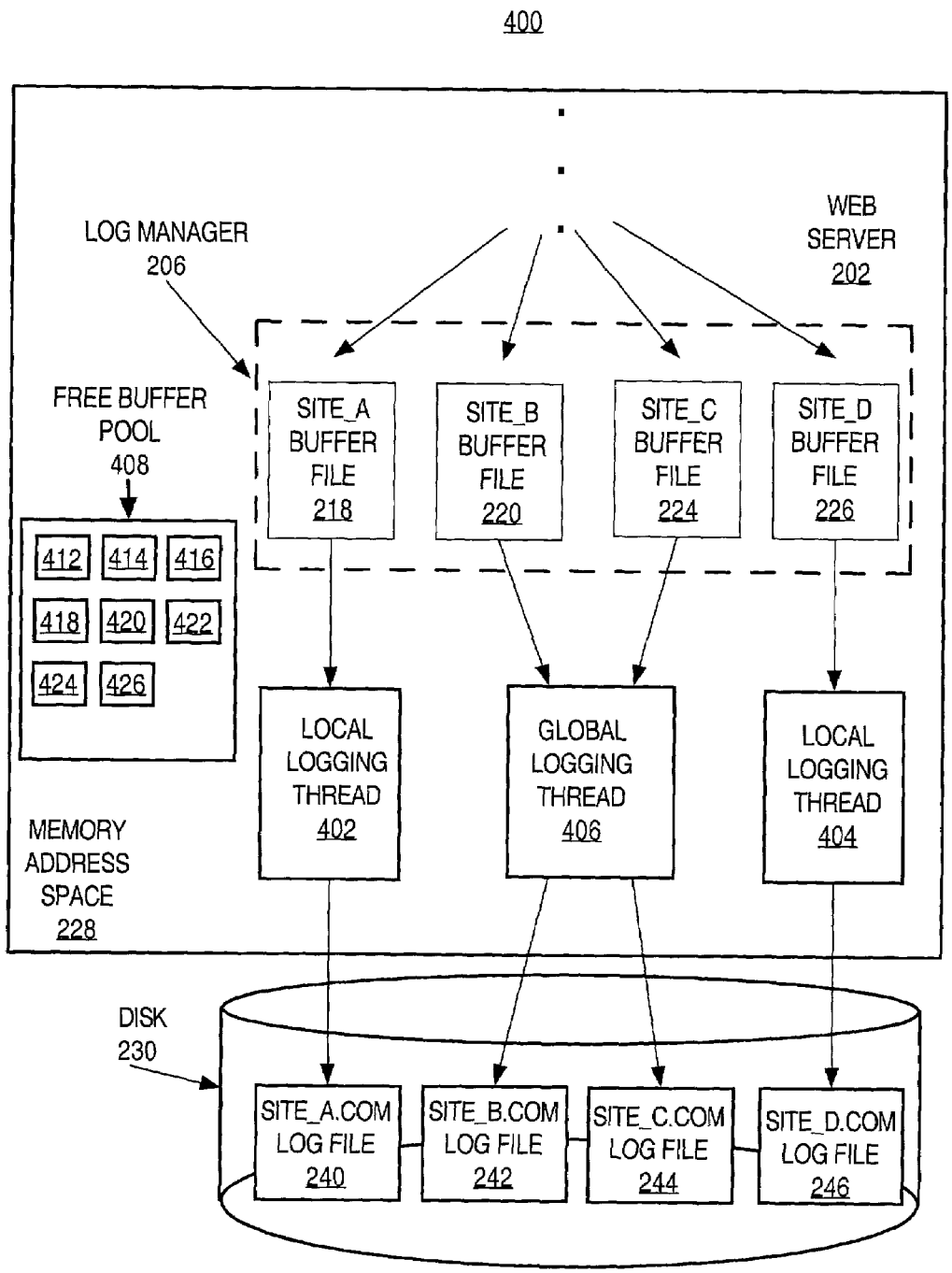
FIG. 4A is a block diagram that further illustrates certain internal details that may be included in the web server described in FIG. 2A.

For example, FIG. 4A is a block diagram that further illustrates certain internal details that may be included in web server 202 as previously described in FIG. 2A. As depicted in the example, web server 202 includes a group of one or more logging threads (local logging threads 402, 404 and global logging thread 406) that are used to write log data from data buffers in log manager 206 to logs files (240,242, 244,246) in disk 230. In addition, in certain embodiments, the logging threads (local logging threads 402, 404 and global logging thread 406) are responsible for either re-linking emptied data buffers into the buffer array of their assigned buffer file, or for inserting emptied data buffers into the free buffer pool 408.

In one embodiment, logging threads (402,404,406) are responsible for actively monitoring the number of requests that are directed to web site domains that are being serviced by the web server ("domain traffic"). Based on the domain traffic for a particular web site domain, the logging threads (402,404,406) can dynamically adjust the number of data buffers that are associated with the buffer file for that particular web site domain. For example, by monitoring the number of buffers that are moved into the buffer full list 310, local logging thread 402 can determine the throughput demands that are currently required for the web site domain SITE_A.COM. Based on the throughput demands, local logging thread 402 can dynamically adjust the certain variables that can affect the number of resources that are available for servicing requests that are directed to the web site domain SITE_A.COM. For example, based on the throughput demands for web site domain SITE_A.COM, local logging thread 402 can dynamically adjust the resources (bandwidth) that is allocated to SITE_A.COM by tuning such factors as: (1) the number of entries in buffer array 308; (2) the minimum or maximum number of data buffers that are to be consistently linked to buffer array 308; (3) whether a buffer is to be re-linked into buffer array after its contents are written to secondary memory; along with other factors that may influence the resources that are allocated to SITE_A.COM.

In certain embodiments, web site domains that are experiencing a large amount of traffic may be assigned a local logging thread to reduce the contention that can exist in a global logging thread that is configured to service multiple web site domains. For example, as depicted in FIG. 4A, local logging threads 402 and 404 have respectively been assigned to service SITE_A buffer file 218 (web site domain SITE_A.COM) and SITE_D buffer file 226 (web site domain SITE_D.COM). Alternatively, global logging thread 406 is assigned to service both SITE_B buffer file 220 (web site domain SITE_B.COM) and SITE_C buffer file 224 (web site domain SITE_C.COM). Thus, resources associated with the SITE_B.COM and SITE_C.COM domains will be required to compete with each other for certain data logging resources.

Moving Buffer to a Ready-to-Write Buffer List

As previously described, buffers that contain log data that are ready to be written to secondary storage ("ripe buffers") are removed from their associated buffer array and inserted into a ready-to-write buffer list within the buffer log file. In one embodiment, the logging thread that has been assigned to the particular buffer file is configured to identify and remove ripe buffers from the buffer array and to insert the buffers into the ready-to-write buffer list for subsequent storing to secondary memory.

A variety of methods and/or techniques may be used for identifying ripe buffers. For example, a buffer that is completely full, or a buffer that has only a limited amount of free space, (for example a certain number of free blocks or bytes, or a certain percentage of total free space), may be identified as a ripe buffer and thus removed and inserted into a ready-to-write buffer list.

Additionally, in certain embodiments, buffers that are considered "stale" (i.e., buffers that contain data but that have not been removed from the buffer array for a particular amount of time), may be marked as ripe buffers and thus removed and inserted into the ready-to-write buffer list. For example, logging thread 402 may be configured to periodically identify and remove buffers that contain log data and that have remained attached to the buffer array 308 for a particular period of time. Alternatively, or in addition to, logging thread 402 may be configured to reduce the amount of time that log data remains within a buffer by removing and inserting into the ready-to-write buffer list 310 all buffers that contain log data as of a particular time of day (for example, 2:00 am).

Sequence for Storing Log Data to Secondary Memory

Figure 4B:
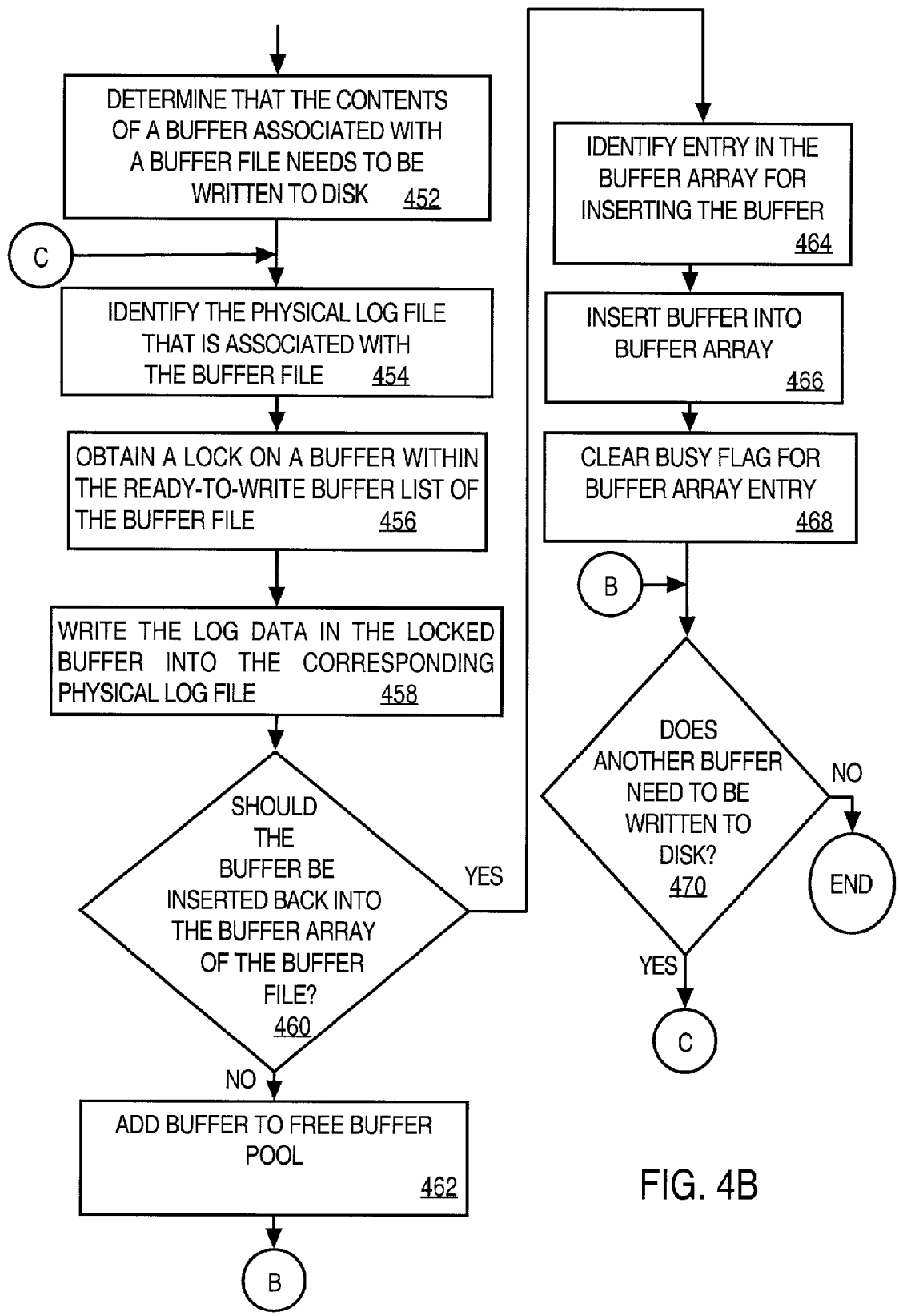
FIG. 4B is a flow diagram that illustrates an example of a method for identifying a log file in secondary memory and for writing the log data into the identified log file in secondary memory.

FIG. 4B is a flow diagram 450 that illustrates an example of a method for identifying a log file in secondary memory and for writing the log data into the identified log file in secondary memory (see block 268 of FIG. 2B). For explanation purposes, FIG. 4B is described in reference to the components of FIGS. 2A, 3A and 4A.

At block 452, a logging thread determines that the contents of a data buffer that is associated with a buffer file should be written to secondary memory. For example, for explanation purposes it shall be assumed that local logging thread 402 determines that buffer 322 in ready-to-write buffer list 310 of SITE_A buffer file 218 should be written out to disk 230.

At block 454, the log file in secondary memory that is associated with the buffer file is identified. For example, based on the value of file descriptor 304 (SITE_A.COM LOG FILE) in SITE_A buffer file 218, local logging thread 402 determines that SITE_A.com log file 240 on disk 230 is assigned to store log data that is associated with SITE_A buffer file 218.

At block 456, the logging thread obtains a lock on the data buffer within the ready-to-write buffer list of the buffer file. For example, a local logging thread 402 obtains a mutually exclusive lock on buffer 322 in ready-to-write buffer list 310 of SITE_A buffer file 218.

At block 458, the logging thread writes the contents of the locked data buffer into the previously identified log file in secondary memory. For example, local logging thread 402 writes the log data that is contained in buffer 322 into SITE_A.com log file 240 on disk 230.

At block 460, a decision is made as to whether the data buffer should be inserted back into the buffer array within the buffer file. For example, after logging the data to secondary storage, local logging thread 402 determines whether or not buffer 322 should be re-inserted back into buffer array 308. As previously indicated, a variety of factors, which may include the amount of traffic that is currently being received for the particular web site domain (SITE_A.COM), can be used in determining whether a buffer should be inserted back into the buffer array. If at block 460 it is determined that the buffer should be inserted back into the buffer array, control proceeds to block 464.

Alternatively, if at block 460 it is determined that the buffer should not be inserted back into the buffer array, at block 462 the buffer is added into the free buffer pool. Control then proceeds to block 470. For example, if local logging thread 402 determines that buffer 322 should not be inserted back into buffer array 308, local logging thread 402 causes buffer 322 to be placed into free buffer pool 408.

At block 464, an entry in the buffer array is identified for inserting the data buffer. For explanation purposes, it is assumed that the entry within buffer array 308 that is associated with an array index of "1" is selected for re-inserting buffer 322.

At block 466, the data buffer is inserted back into the buffer array. For example, buffer 332 is linked back into the entry associated with an array index of "1" in buffer array 308.

At block 468, the flag associated with the entry in which the data buffer was reinserted in the buffer array is cleared to indicate that the entry is likely available for buffering log data. For example, the flag for the entry within buffer array 308 that is associated with an array index of "1" is set to "0" to indicate to the server threads (210,212,214,216) that the entry includes a buffer (buffer 322) that is likely available for buffering log data.

At block 470, it is determined whether the contents of another buffer should be written out to secondary memory. If it is determined that the contents of another buffer should be written out to secondary memory, control proceeds to block 454. In certain embodiments, if the next identified buffer is located within the same ready-to-write buffer list, control may instead proceed to block 456 to obtain a lock on the next identified buffer. For example, because local logging thread 402 is assigned to a single buffer file (SITE_A buffer file 218), by default the log file will generally remain the same between multiple buffers unless multiple log files are used for a single web site domain.

In addition, although the example illustrates separate locks for each buffer that is being written to disk, in certain embodiments, the ready-to-write buffer list is itself locked by the logging thread, thus potentially reducing the overhead that is associated with locking and unlocking multiple buffers within a ready-to-write buffer list.

Hardware Example

Figure 5:
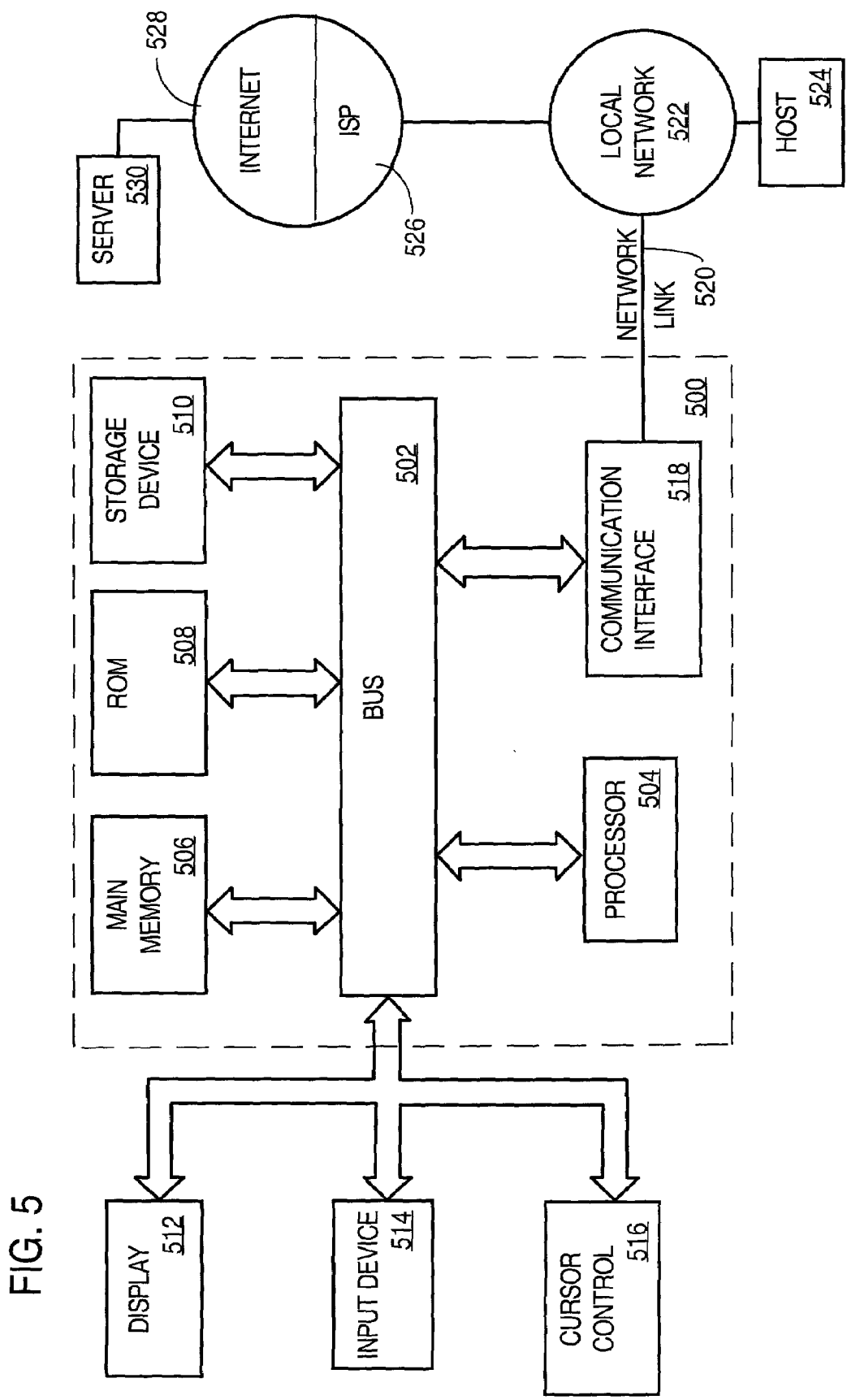
FIG. 5 is a block diagram of a computer system with which an embodiment may be carried out.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for dynamically tuning the allocation data buffers. According to one embodiment of the invention, dynamically tuning of the allocation of data buffers is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for dynamically tuning the allocation data buffers as described herein.

The received code may be executed by processor 504 as it is received, and/or stored in storage device 510, or other non-volatile storage for later execution.

Alternatives, Extensions

In describing certain embodiments of the invention, several drawing figures have been used for explanation purposes. However, the invention is not limited to any particular context that is shown in the drawing figures, as the scope of the invention includes other contexts and applications in which the mechanisms and processes described herein are available to other mechanisms, methods, programs, and processes. Thus, the specification and drawings are, accordingly, to be regarded in an illustrative rather than a restrictive sense.

For example, although embodiments of the invention have been described in reference to logging log data in a web server system, embodiments of the invention may be applied to various other forms or types of shared data sink systems where different threads of execution may be utilized for buffering data. For example, embodiments of the invention may be used for managing the buffering data in a variety of different systems and/or configuration such as in network connection and/or router systems, printer system, copier systems, fax systems, etc. Thus, embodiments of the invention should not be construed as limited to either log data or web server applications as the specification and drawings are, accordingly, to be regarded in an illustrative rather than a restrictive sense.

As a further example, although FIG. 2A illustrates a system executing in a single memory address space 228, embodiments of the invention may be practiced using a variety of different software and/or hardware configurations. For example, in certain embodiments, web server 202 may include multiple address spaces that each include the components depicted in memory address space 228. In addition, certain embodiments of the invention may include the use of multiple processes, multiple processors or even multiple computers executing as part of web server 202.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for dynamically allocating data buffers to a data structure, comprising the computer-implemented steps of:
   assigning a logging thread to said data structure, wherein said logging thread is configured to insert free data buffers into said data structure;
   monitoring a number of buffers that are moved into a full buffer list from the data structure;
   determining, based on the number of buffers, throughput demands that are currently required for a web site domain that is associated with the data structure;
   based on the throughput demands that are currently required for the web site domain, changing a minimum number of data buffers that are to be consistently linked to the data structure; and
   if a number of data buffers that are currently linked to the data structure is less than the minimum number, then performing steps comprising:
      identifying one or more free buffers that are within a free buffer pool; and
      linking said one or more free data buffers into said data structure;
   wherein said one or more free data buffers are stored within a memory of a computer system.

2. The method of claim 1, further comprising the steps of:
   receiving requests for content that is associated with a web site domain;
   generating log data based on the requests; and
   writing said log data in one or more data buffers associated with said data structure.

3. The method of claim 1, wherein the step of linking said one or more free data buffers into said data structure includes linking said one or more free data buffers into said data structure into which one or more other data buffers already are linked.

4. The method of claim 1, further comprising the steps of:
   determining that a particular data buffer should be removed from said data structure;
   unlinking said particular data buffer from said data structure; and
   inserting said particular data buffer into a ready-to-write buffer list.

5. The method of claim 4, wherein the step of determining that a particular data buffer should be removed comprises the step of detecting that said particular data buffer is full.

6. The method of claim 4, wherein the step of determining that a particular data buffer should be removed comprises the step of detecting that said particular data buffer has not been removed from said data structure for a particular period of time.

7. The method of claim 4, further comprising the steps of:
   removing said particular data buffer from said ready-to-write buffer list, wherein said ready-to-write buffer list is located within a first memory area;
   storing log data information in said particular data buffer to a second memory area, wherein said second memory area is distinct from said first memory area; and
   inserting said particular data buffer into said free buffer pool, wherein said free buffer pool maintains free data buffers that may be inserted into any one of a plurality of data structures that are each associated with a particular web site domain.

8. The method of claim 7, wherein:
   the step of identifying one or more free buffers comprises the step of selecting one or more free buffers from said free buffer pool; and
   the step of linking said one or more free data buffers into said data structure comprises the steps of,
      identifying one or more entries in said data structure; and
      linking said one or more free data buffers into said one or more entries in said data structure.

9. The method of claim 4, wherein:
   said log data is generated based on request that are received for content associated with a particular web site domain; and
   said step of inserting said particular data buffer comprises the step of linking said particular data buffer into a queue that maintains only data buffers that contain log data associated with requests for said particular web site domain.

10. A computer-readable medium carrying one or more sequences of instructions for dynamically allocating data buffers to a data structure, wherein execution of the one or more sequences of instructions by one or more processors causes the one or more processors to perform the steps of:
   assigning a logging thread to said data structure, wherein said logging thread is configured to insert free data buffers into said data structure;
   monitoring a number of buffers that are moved into a full buffer list from the data structure;
   determining, based on the number of buffers, throughput demands that are currently required for a web site domain that is associated with the data structure;
   based on the throughput demands that are currently required for the web site domain, changing a minimum number of data buffers that are to be consistently linked to the data structure; and
   if a number of data buffers that are currently linked to the data structure is less than the minimum number, then performing steps comprising:
      identifying one or more free buffers that are within a free buffer pool; and
      linking said one or more free data buffers into said data structure.

11. The computer-readable medium of claim 10, further comprising instructions for performing the steps of:

receiving requests for content that is associated with a web site domain;

generating log data based on the requests; and writing said log data in one or more data buffers associated with said data structure.

12. The computer-readable medium of claim 10, wherein the step of linking said one or more free data buffers into said data structure includes linking said one or more free data buffers into said data structure into which one or more other data buffers already are linked.

13. The computer-readable medium of claim 10, further comprising instructions for performing the steps of:

determining that a particular data buffer should be removed from said data structure;

unlinking said particular data buffer from said data structure; and inserting said particular data buffer into a ready-to-write buffer list.

14. The computer-readable medium of claim 13, wherein the step of determining that a particular data buffer should be removed comprises the step of detecting that said particular data buffer is full.

15. The computer-readable medium of claim 13, wherein the step of determining that a particular data buffer should be removed comprises the step of detecting that said particular data buffer has not been removed from said data structure for a particular period of time.

16. The computer-readable medium of claim 13, further comprising instructions for performing the steps of:

removing said particular data buffer from said ready-to-write buffer list, wherein said ready-to-write buffer list is located within a first memory area;

storing log data information in said particular data buffer to a second memory area, wherein said second memory area is distinct from said first memory area; and inserting said particular data buffer into said free buffer pool, wherein said free buffer pool maintains free data buffers that may be inserted into any one of a plurality of data structures that are each associated with a particular web site domain.

17. The computer-readable medium of claim 16, wherein:

the step of identifying one or more free buffers comprises the step of selecting one or more free buffers from said free buffer pool; and the step of linking said one or more free data buffers into said data structure comprises the steps of, identifying one or more entries in said data structure; and linking said one or more free data buffers into said one or more entries in said data structure.

18. The computer-readable medium of claim 13, wherein:

said log data is generated based on request that are received for content associated with a particular web site domain; and said step of inserting said particular data buffer comprises the step of linking said particular data buffer into a queue that maintains only data buffers that contain log data associated with requests for said particular web site domain.

19. A method for processing requests for content that is associated with different web site domains, the method comprising:

receiving, at a web server, a first request for access to first content that is associated with a first web site domain of a plurality of web site domains;

queueing the first request within a connection queue;

assigning a first server thread of a plurality of server threads to service the first request;

in response to being assigned a task of servicing the first request, the first server thread determining to which web site domain of the plurality of web site domains the first request is related;

the first server thread loading first configuration data for the first web site domain in response to determining that the first request is related to the first web site domain, wherein, by loading the first configuration data, the first server thread is temporarily configured as a server thread that is dedicated to servicing requests for content that is available within the first web site domain;

the first server thread generating first log data based on the first content, wherein the first log data includes information that identifies a first web page that was requested within the first web site domain;

the first server thread selecting, from among a plurality of buffer files, a first buffer file that is associated with the first web site domain, wherein the first buffer file contains buffers that are to be used for buffering log data that is associated with the first web site domain;

the first server thread selecting a first buffer from among a plurality of buffers within the first buffer file;

the first server thread writing the first log data into the first buffer;

a logging thread selecting, from among a plurality of physical log files, a first physical log file that is associated with the first buffer file, wherein each physical log file of the plurality of physical log files is associated with a separate buffer file of the plurality of buffer files;

a logging thread storing, into the first physical log file, information contained within the first buffer;

receiving, at the web server, a second request for access to second content that is associated with a second web site domain of a plurality of web site domains, wherein the second web site domain is separate from the first web site domain;

queueing the second request within the connection queue;

assigning a second server thread of the plurality of server threads to service the second request, wherein the second server thread is separate from and executes concurrently with the first server thread;

in response to being assigned a task of servicing the second request, the second server thread determining to which web site domain of the plurality of web site domains the second request is related;

the second server thread loading second configuration data for the second web site domain in response to determining that the second request is related to the second web site domain, wherein, by loading the second configuration data, the second server thread is temporarily configured as a server thread that is dedicated to servicing requests for content that is available within the second web site domain, wherein the second configuration data differs from the first configuration data;

the second server thread generating second log data based on the second content, wherein the second log data includes information that identifies a second web page that was requested within the second web site domain;

the second server thread selecting, from among the plurality of buffer files, a second buffer file that is associated with the second web site domain, wherein the second buffer file contains buffers that are to be used for buffering log data that is associated with the second web site domain, wherein the second buffer file differs from the first buffer file;

the second server thread selecting a second buffer from among a plurality of buffers within the second buffer file;

the second server thread writing the second log data into the second buffer;

a logging thread selecting, from among the plurality of physical log files, a second physical log file that is associated with the second buffer file, wherein the second physical log file is separate from the first physical log file; and a logging thread storing, into the second physical log file, information contained within the second buffer;

wherein the first buffer is stored within a memory of a computer system.

20. The method of claim 19, further comprising:

a logging thread determining whether to remove the first buffer from a buffer array that is contained in the first buffer file, wherein determining whether to remove the first buffer is based on at least one of (a) an amount of free space that is left within the first buffer and (b) an amount of time that the first buffer has been linked within the buffer array;

in response to a logging thread determining that the first buffer should be removed from the buffer array, a logging thread moving the first buffer from the buffer array to a ready-to-write buffer list that is contained in the first buffer file.

21. The method of claim 19, further comprising:

a logging thread determining whether a current time of day is a specified time of day;

in response to a logging thread determining that the current time of day is the specified time of day, a logging thread determining whether the first buffer contains log data; and in response to a logging thread determining that the first buffer contains log data as of the specified time of day, a logging thread moving the first buffer from a buffer array, which is contained in the first buffer file, to a ready-to-write buffer list that is contained in the first buffer file.

22. The method of claim 1, wherein linking said one or more free data buffers into said data structure comprises linking multiple data buffers into said data structure.

23. The computer-readable medium of claim 10, wherein linking said one or more free data buffers into said data structure comprises linking multiple data buffers into said data structure.

* * * * *